Feb. 26, 1963 A. ANGIOLETTI 3,078,519
ELASTIC DRAFT PRESSURE ROLLER FOR SPINNING MACHINES
Filed June 17, 1960 2 Sheets-Sheet 1

INVENTOR
Attilio Angioletti
BY Stevens, Davis, Miller & Mosher
ATTORNEYS

Feb. 26, 1963   A. ANGIOLETTI   3,078,519
ELASTIC DRAFT PRESSURE ROLLER FOR SPINNING MACHINES
Filed June 17, 1960   2 Sheets-Sheet 2

INVENTOR
Attilio Angioletti

BY Stevens, Davis, Miller & Mosher
ATTORNEYS

United States Patent Office 3,078,519
Patented Feb. 26, 1963

3,078,519
ELASTIC DRAFT PRESSURE ROLLER FOR SPINNING MACHINES
Attilio Angioletti, Milan, Italy, assignor to Pirelli S.p.A., Milan, Italy
Filed June 17, 1960, Ser. No. 36,815
Claims priority, application Italy Oct. 8, 1959
6 Claims. (Cl. 19—258)

The present invention relates to an elastic draft pressure roller for spinning machines, and more particularly, to a roller whose various parts are made of different types of rubber, the characteristics and quality of which are chosen in accordance with the purposes for which the various parts of the roller are intended.

In the past various different types of rollers have been proposed and employed for the same general purpose referred to above. These rollers generally involve an essentially spool-shaped construction where the two end flanges (or terminal rings) are made of metal. Various rubber or elastic sleeves are combined in various ways with the metallic flanges to complete the roller.

In accordance with the present invention, the entire roller, including the end flanges (or terminal rings), is made of rubber. The end flanges are made of antistatic hard rubber. These flanges are joined together by an internal core or tube of rubber having the same or similar properties; in fact, the flanges and the core (forming a resulting spool shape) can be made as a unitary construction. The annular space between the flanges and the core is filled with an elastic substance of porous structure (as, for example, natural or synthetic rubber, polyurethanes, synthetic resin and the like). The filling should have a diameter slightly greater than the diameter of the flanges. The roller is then covered with a thin sheet of very elastic antistatic rubber which will come in contact with the slubbing to be drawn. Thus, it should appear that the various parts of the roller are constructed of different types of rubber having different properties.

Therefore, it is the principal object of the present invention to provide an elastic draft pressure roller for spinning machines wherein the roller is composed entirely of rubber and wherein the characteristics and quality of the different types of rubber are chosen in accordance with the purposes for which the various parts of the roller are intended.

Other and further objects and advantageous features of the present invention will hereinafter more fully appear in consideration of the following detailed descriptions of the drawings wherein.

Figure 1:
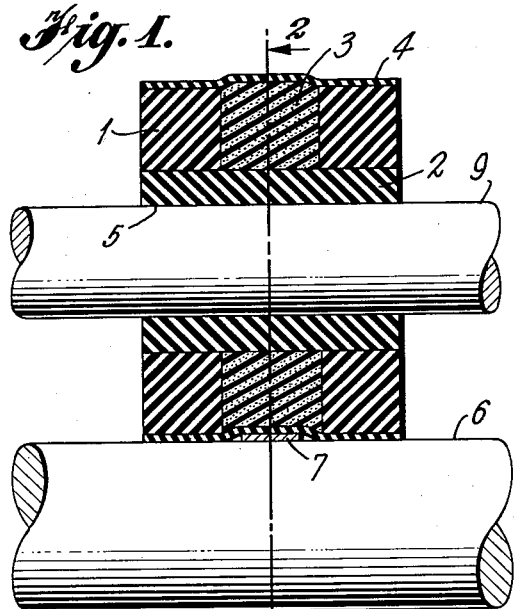
FIGURE 1 is a cross-sectional view of a pressure roller constructed in accordance with the present invention showing the same in its working relation with a metallic roller.
Figure 2:
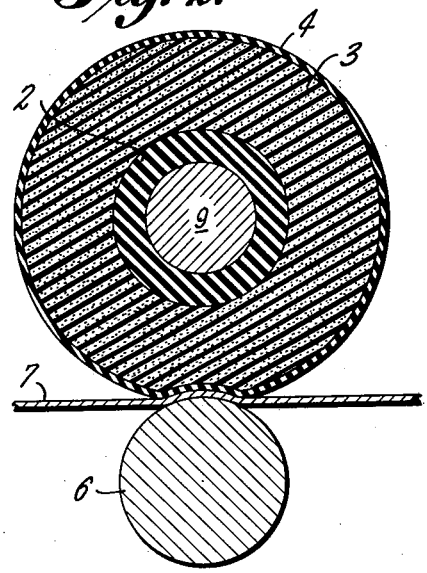
FIGURE 2 is a cross-sectional view taken along section line 2—2 of FIGURE 1.
Figure 7:
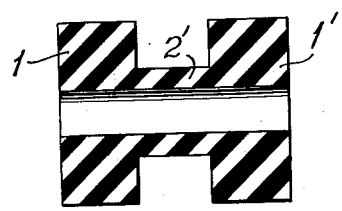
FIGURE 7 is a semi-diagrammatic cross-sectional view showing a modification of a portion of the structure illustrated in FIGURE 1 wherein the parallel rings and core are formed as a single integral body.

Referring now to the drawings in detail, FIGURES 1 and 2 show a roller composed of two spaced parallel flanges or rings 1 made of antistatic hard rubber and a rubber tube or core 2 connecting the rings 1. If desired, the rings 1 and core 2 can be made as a single integral body. For example, FIGURE 7 shows a modification of FIGURE 1 wherein the parallel rings 1' and the core 2' are formed as a unitary structure. The annular space surrounding the core between the two rings is filled with a porous elastic substance 3 having an outer diameter greater than that of the rings. A thin outer covering 4 of antistatic rubber surrounds the rings 1 and the filling 3. The covering 4 should be very elastic and highly resistant to abrasion. The core 2 is provided with a central hole 5 for receiving therein a shaft or pin 9 upon which the roller is mounted.

The rubber roller described above is adapted to bear against, and cooperate with, a metallic roller 6 in such a manner that the slubbing 7 can be drawn between the two rollers.

Figure 3:
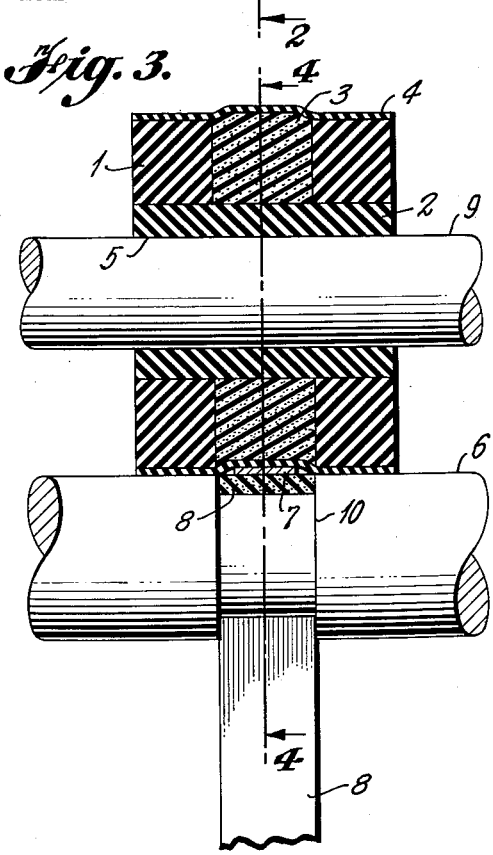
FIGURE 3 is a sectional view similar to FIGURE 1 showing the rubber roller of the present invention in substantially the same form but showing a modification of the metallic roller.
Figure 4:
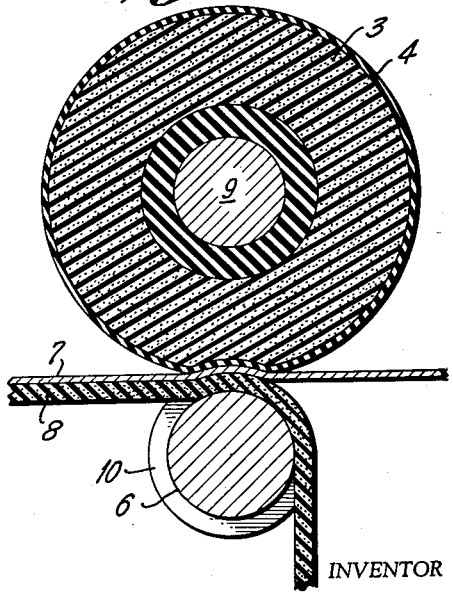
FIGURE 4 is a cross-sectional view taken along section line 4—4 of FIGURE 3.

In FIGURES 3 and 4, the rubber roller is substantially the same as described above; however, the metallic roller 6 has been provided with an annular recess 10 in which is received a flexible belt 8, the latter bearing against the rubber roller (against the covering 4) in the region opposite the filling 3. The slubbing 7, in being drawn between the two rollers, thus contacts the covering 4 and the belt 8.

Figure 5:
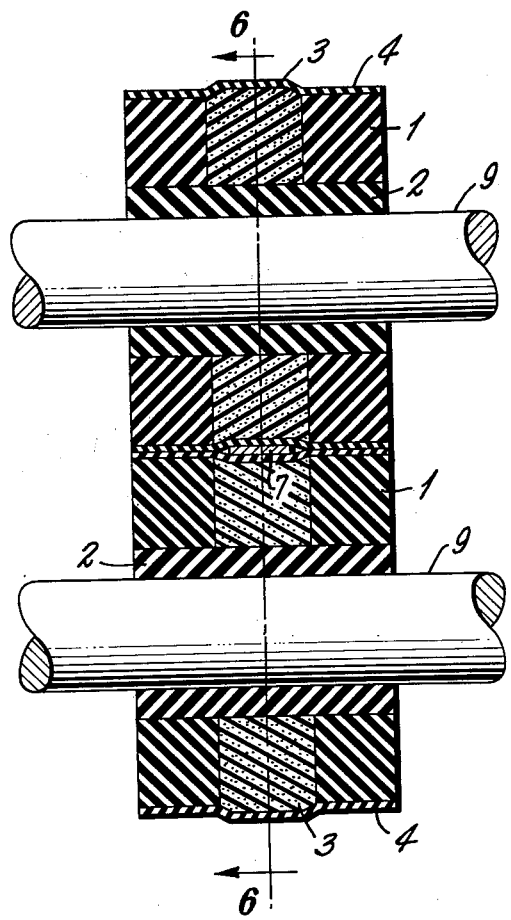
FIGURE 5 is a cross-sectional view showing two rollers in working relation where both rollers are made entirely of rubber in accordance with the present invention.
Figure 6:
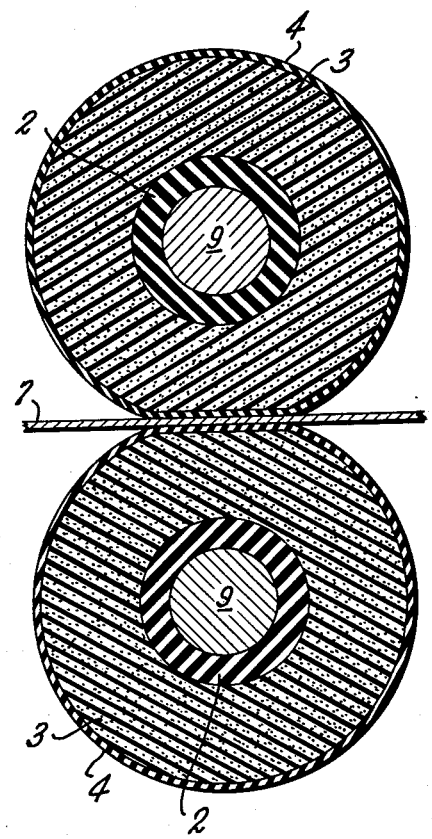
FIGURE 6 is a cross-sectional view taken along section line 6—6 of FIGURE 5.

In FIGURES 5 and 6, the upper (rubber) roller is substantially the same whereas the lower metallic roller has been replaced by a second rubber roller which is substantially the same as the upper roller. Thus, the slubbing 7 is drawn between two essentially identical rollers, both of which are constructed in accordance with the present invention.

By means of the present invention, the drawing pressure between two identical rubber rollers, or between a rubber roller and a metallic roller, is essentially constant by virtue of the thin rubber layer which bears against the porous filling.

The rubber roller of the present invention has its various different parts composed of various different rubbers, as indicated above, whose characteristics have been selected in accordance with the purposes for which the various parts of the roller are intended.

Whereas the present invention has been described with particular reference to the drawings attached hereto, it should be understood that other and further modifications, apart from those shown or suggested herein, might be made within the spirit and scope of this invention.

What is claimed is:

1. An elastic draft pressure roller comprising a pair of spaced parallel rings of antistatic hard rubber, a central core of antistatic hard rubber connecting said rings and having a central cylindrical portion of smaller diameter than the outer diameter of said rings so as to provide an annular space surrounding said core between said two rings, a filling of an elastic substance of porous structure received in said space and having an outer diameter greater than the outer diameter of said rings, and a thin sheet of antistatic rubber covering said rings and said filling, said roller thereby having a compressible and thickened central portion.

2. An elastic draft pressure roller as set forth in claim 1 wherein said rings and said core are constructed as a single integral body.

3. An elastic draft pressure roller as set forth in claim 1 wherein said elastic substance of porous structure is selected from the group consisting of natural rubber, synthetic rubber and polyurethanes, 4. The combination of an elastic draft pressure roller and metallic roller mounted in contacting relation, said elastic draft pressure roller comprising a pair of spaced parallel rings of antistatic hard rubber, a central core of antistatic hard rubber connecting said rings and having a central cylindrical portion of smaller diameter than the outer diameter of said rings so as to provide an annular space surrounding said core between said two rings, a filling of an elastic substance of porous structure received in said space having an outer diameter greater than the outer diameter of said rings, a thin sheet of antistatic rubber covering said rings and said filling, said roller thereby having a compressible and thickened central portion, and said metallic roller mounted in contacting relation with said elastic roller whereby a slubbing may be drawn between said two rollers in the region of said compressible thickened central portion.

5. The combination of an elastic draft pressure roller and metallic roller as set forth in claim 4 wherein said metallic roller is provided with an annular recess opposite the compressible thickened central portion of said elastic roller, and wherein a flexible belt is received within said recess, whereby a slubbing may be drawn between said belt and said thin sheet of antistatic rubber in the region of said compressible thickened central portion.

6. A pair of elastic draft pressure rollers mounted in contacting relation with each other, each roller comprising a pair of spaced parallel rings of antistatic hard rubber, a central core of antistatic hard rubber connecting said rings and having a central cylindrical portion of smaller diameter than the outer diameter of said rings so as to provide an annular space surrounding said core between said two rings, a filling of an elastic substance of porous structure received in said space and having an outer diameter greater than the outer diameter of said rings, and a thin sheet of antistatic rubber covering said rings and said filling, each said roller thereby having a compressible and thickened central portion, the compressible thickened portions of said rollers being opposed whereby a slubbing may be drawn between said two elastic rollers in the region of the opposed compressible thickened central portions.

References Cited in the file of this patent

UNITED STATES PATENTS

| 1,809,251 | Pflimlin | June 9, 1931 |
| 3,006,037 | Bettolo | Oct. 31, 1961 |

FOREIGN PATENTS

| 9,123 | Great Britain | of 1931 |